United States Patent [19]
Hartung et al.

[11] Patent Number: 5,660,041
[45] Date of Patent: Aug. 26, 1997

[54] PROCESS FOR ADJUSTING THE CHARACTERISTICS OF INFINITELY VARIABLE TRANSMISSIONS OF A VEHICLE

[75] Inventors: Erwin Hartung, Stockstadt; Hilmar Strenzke, Aschaffenburg, both of Germany

[73] Assignee: Linde Aktiengesellschaft, Germany

[21] Appl. No.: 562,340

[22] Filed: Nov. 22, 1995

Related U.S. Application Data

[63] Continuation of Ser. No. 190,981, Feb. 2, 1994, abandoned.

[30] Foreign Application Priority Data

Feb. 4, 1993 [DE] Germany .................... 43 03 243.5

[51] Int. Cl.⁶ .................................................. F16D 31/02
[52] U.S. Cl. ........................ 60/327; 60/328; 60/395; 60/445; 60/448
[58] Field of Search .......................... 60/327, 328, 395, 60/445, 448

[56] References Cited

U.S. PATENT DOCUMENTS

| | | | |
|---|---|---|---|
| 3,914,938 | 10/1975 | Cornell et al. | 60/445 |
| 5,249,422 | 10/1993 | Smith et al. | 60/431 |

FOREIGN PATENT DOCUMENTS

| | | |
|---|---|---|
| 0217367 | 6/1987 | European Pat. Off. . |
| 0226844 | 7/1987 | European Pat. Off. . |
| 0563515 | 10/1993 | European Pat. Off. . |
| 2685264 | 6/1993 | France . |
| 2700803 | 7/1978 | Germany . |
| 3613661 | 10/1987 | Germany . |
| 3628175 | 12/1987 | Germany . |
| 1515157 | 10/1975 | United Kingdom . |
| 1524196 | 10/1975 | United Kingdom . |
| 8001400 | 7/1980 | WIPO . |

OTHER PUBLICATIONS

Japan Patent Abstract No. 62-146784, Jun. 30, 1987, "Control Circuit for Manually Steering Truck" vol. 11, No. 372 (M-648) [2819]. Dec. 4, 1987, (English language).

"Programmgesteuerte und-geregelte hydrostatische Mobilantriebe", Reinhard Vonnoe, Apr. 14, 1992 pp. 206-208, 211, 212, 214, 216, 218 & 221.

*Primary Examiner*—F. Daniel Lopez
*Attorney, Agent, or Firm*—Webb Ziesenheim Bruening Logsdon Orkin & Hanson, P.C.

[57] ABSTRACT

A process for adjusting the characteristics of infinitely variable transmissions of a vehicle with two drive mechanisms including detecting the output speeds of the transmissions and comparing them by means of an operating variable to determine the gear ratio. Adjusting the gear ratio as a function of a deviation for matching the characteristics. The characteristics are completely carried out for the operating variable and are detected and stored in a close point sequence by measuring the output speeds. When the vehicle is travelling, the deviations of the characteristics are compensated by an electronic unit which influences the predetermined operating variables so that when the transmissions are operated with the same predetermined operating variable, the output speeds are identical despite different characteristics.

11 Claims, 1 Drawing Sheet

PROCESS FOR ADJUSTING THE CHARACTERISTICS OF INFINITELY VARIABLE TRANSMISSIONS OF A VEHICLE

This is a continuation of application Ser. No. 08/190,981 filed on Feb. 2, 1994, now abandoned.

BACKGROUND OF THE INVENTION

1. Field of the Invention

The invention relates generally to a process for adjusting the characteristics of infinitely variable transmissions, in particular hydrostatic transmissions, and more particularly transmissions in vehicles having separate travelling drive mechanisms for each side of the vehicle. The invention particularly concerns a process wherein the output speeds of the transmissions are detected and compared with one another via an operating variable which determines the gear ratio, and as a function of a deviation from the operating variable, the gear ratio is adjusted in order to match the characteristics and thus the output speeds of the transmissions.

In the case of vehicles where each side of the vehicle is driven by an infinitely variable transmission, for example loading tractors and bulldozers with two caterpillar tracks each driven by a respective hydrostatic transmission, the manufacture of the two transmissions requires a higher degree of accuracy than in the case of vehicles propelled by only a single such transmission. The reason for this is the desire to obtain transmission characteristics for the two transmissions which are as identical as possible to one another. The characteristic of a transmission is defined as the relationship between the output speed of the transmission and an operating variable. Only when the characteristics of the transmissions are identical is synchronous running of the connected components (e.g., caterpillar tracks) obtained. Then, when the value of the operating variable is the same for each transmission, the same output speed is achieved. Otherwise, although the operating variables for both transmissions may be identical, the output speeds of the transmissions will differ and the speed of one side of the vehicle will differ from that of the other. In this situation, the vehicle will unintentionally move along a curved path, thereby necessitating continuous regulatory correction by the driver. In practice, despite efforts to ensure high production quality and consistency, the transmissions exhibit different characteristics. This makes it necessary, before the vehicle is started up, to adjust the two transmissions in order to achieve operation which is as synchronous as possible. This adjustment must be very accurate to minimize so-called synchronism errors. This is also a prerequisite for the reliable functioning of a superimposed synchronism control device.

2. Prior Art

In a known adjustment procedure for crawler drives with electronic control of the gear ratio, the two output speeds are electronically detected and compared with one another via the parameter of the operating variable. The strength of the electric current which acts upon an electromagnetic control valve to determine the delivery capacity of a hydrostatic variable displacement pump and/or the absorption capacity of a hydrostatic variable displacement motor is usually chosen as the operating variable. If the output speeds of the two hydrostatic transmissions differ when the value of the operating variable is the same, different settings of the operating variable on the respective transmissions are required in order to achieve synchronism. Thus, for example, it is possible to change a spring bias counteracting the electromagnetic force on the control valve of one of the transmissions, so that the rate of the change in the delivery capacity or absorption capacity of the hydrostatic machine can be adjusted. Additionally, the respective control stop means can be adjusted to limit the maximum delivery or absorption capacity. Thus, when the operating variable (in this example the control current to an electromagnetic control valve) is at a predetermined value for both transmissions, their output speeds are matched.

The described process requires a considerable outlay of time and materials. A special diagnosis device is required with the aid of which the time-consuming and complicated adjustment work can be executed. The components to be adjusted must be rendered accessible to the adjustment work, which generally necessitates the removal of other components. Furthermore, the above described adjustment procedure is carried out not only for a single point of the characteristic of a transmission, but for several points to enable the characteristics of both transmissions to be matched with sufficient accuracy. Isolated adjustment of the characteristics at only one point can lead to an impairment of the characteristic symmetry at other points. Despite adjustment at a plurality of points (generally three), the characteristics of the two transmissions still are not identical.

SUMMARY OF THE INVENTION

The object of the present invention is to provide an improved process for adjusting the characteristics of infinitely variable transmissions which is simpler and more accurate than the prior art.

This object is achieved, in accordance with the invention, in that the characteristics of the transmissions are completely carried out for the operating variable and are detected. The detected characteristics are stored by measuring the output speeds in a close point sequence. In the travelling mode the deviations of the characteristics are compensated by an electronic unit, which influences the predetermined operating variables, so that when the transmissions are operated with the same predetermined operating variable, the output speeds are identical despite different characteristics.

The characteristics of the transmissions are detected prior to the first operation of the vehicle by running through the characteristics either in load-free fashion (with the vehicle jacked up—the simplest method) or under load (travelling on the ground or with a predetermined load on the test bench). The characteristics are recorded virtually without interruption and stored. If a specific operating variable is later defined, the output speeds of the transmissions according to the characteristics are known and corrective intervention can be made so that the same output speeds occur for both transmissions (in the event that two transmissions are provided; in some cases more than two mutually independent travelling drive mechanisms can also be provided on the vehicle). Inconsistencies in the characteristics existing at the time of the adjustment are thus compensated. Therefore, it is no longer necessary to incur the expense involved in precisely manufacturing the individual transmission components to obtain identical characteristics. Thus, transmissions for dual drive line vehicles can be produced with the same degree of precision required for single-line drive mechanisms (drive mechanisms with only one hydrostatic transmission as the travelling drive mechanism). The subsequent, laborious manual adjustment required to reduce the residual synchronism errors can also be dispensed with, thus shortening and substantially simplifying the start-up phase at the customer location.

In a further development of the invention, it is proposed that the characteristics of the transmissions are compared with a reference characteristic in an electronic unit, where the operating variable is increased or reduced in relation to the predetermined operating variable until the output speed of the respective characteristic is identical to the output speed of the reference characteristic associated with the predetermined operating variable.

It is particularly advantageous for the characteristics of the transmissions to be compared with a reference characteristic in the form of an ideal characteristic.

In accordance with another aspect of the invention, it is also possible to compare the characteristics of the transmissions with one another in which case one of the transmission characteristics serves as the reference characteristic. For example, if the characteristic of the transmission of the left-hand travelling drive mechanism is taken as the reference characteristic, the characteristic of the transmission of the right-hand travelling drive mechanism is matched to it.

Advantageously, the process according to the invention is applied to hydrostatic transmissions having an electrically adjustable gear ratio. In such a case, operation generally takes place by means of a microprocessor which is supplied with the output speeds of the transmissions and the theoretical speed value of the vehicle and which thus produces operating variables for the adjustment of the gear ratio taking into account the differences between the individual characteristics of the transmissions and the reference characteristic. With the aid of the existing microprocessor, the characteristics of the transmissions are detected once so that during the continued operation constant automatic characteristic adjustment takes place in the described manner.

A complete understanding of the invention will be obtained from the following description when taken in connection with the accompanying figures of drawings wherein the like reference numerals identify like parts throughout.

DESCRIPTION OF THE PREFERRED EMBODIMENT

Figure 1:
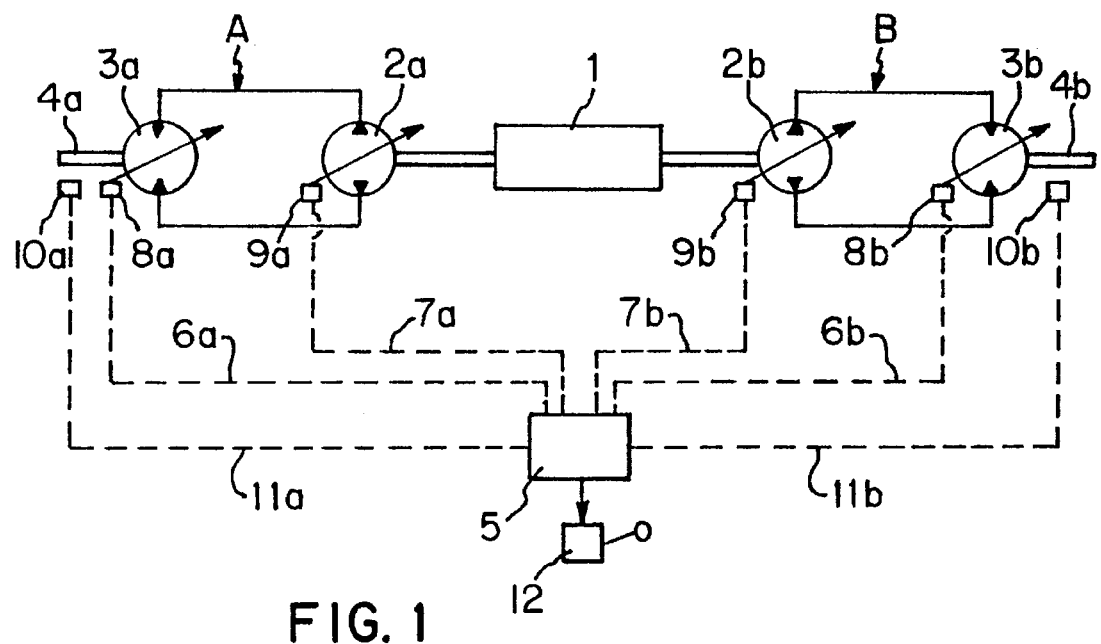
FIG. 1 is a schematic circuit diagram of a two-sided travelling drive mechanism.

Referring to FIG. 1 of the drawings, the two-sided travelling drive mechanism comprises a prime mover 1, for example an internal combustion engine, which drives a variable displacement pump 2a of a hydrostatic transmission shown schematically as A on the left-hand side of the drawing figure, and a variable displacement pump 2b of a hydrostatic transmission shown schematically as B on the right-hand side of the drawing figure. Variable displacement pump 2a is connected to a variable displacement motor 3a in a closed loop and variable displacement pump 2b is connected to a variable displacement motor 3b in a closed loop. Each variable displacement motor 3a and 3b drives a respective rotary shaft 4a and 4b.

It is also possible for only the pump or the respective motor to be adjustable, i.e., the pump 2a may have a constant displacement and may be connected to a variable displacement motor 3a, or vice versa.

The delivery capacity of variable displacement pumps 2a and 2b and the absorption capacity of variable displacement motors 3a and 3b are regulated by means of a microprocessor 5 which is electrically connected by signal lines 6a, 6b, 7a and 7b to respective signal converters 8a, 8b, 9a and 9b. The rotary speeds of shafts 4a and 4b are detected by speed sensors 10a and 10b and are communicated to a microprocessor 5 by respective sensing lines 11a and 11b. The speed values of transmissions A and B are selected by a speed selector 12 which causes microprocessor 5 to supply signal converters 8a, 8b, 9a and 9b with specific operating variables (current or voltage) via respective signal lines 6a, 6b, 7a and 7b. As a result the settings of the pumps and motors, and thus the travel speed of a vehicle equipped with the two-sided travelling drive mechanism shown in FIG. 1 is defined. Here speed selector 12 serves both to predetermine a specific vehicle speed and also, in the case of speed difference steering, to predetermine the rate of turn of the vehicle by defining the difference in the speeds of each transmission. When the vehicle is required to travel in a straight line, microprocessor 5 produces the required operating variables to produce the same output speed for both hydrostatic transmissions.

Figure 2:
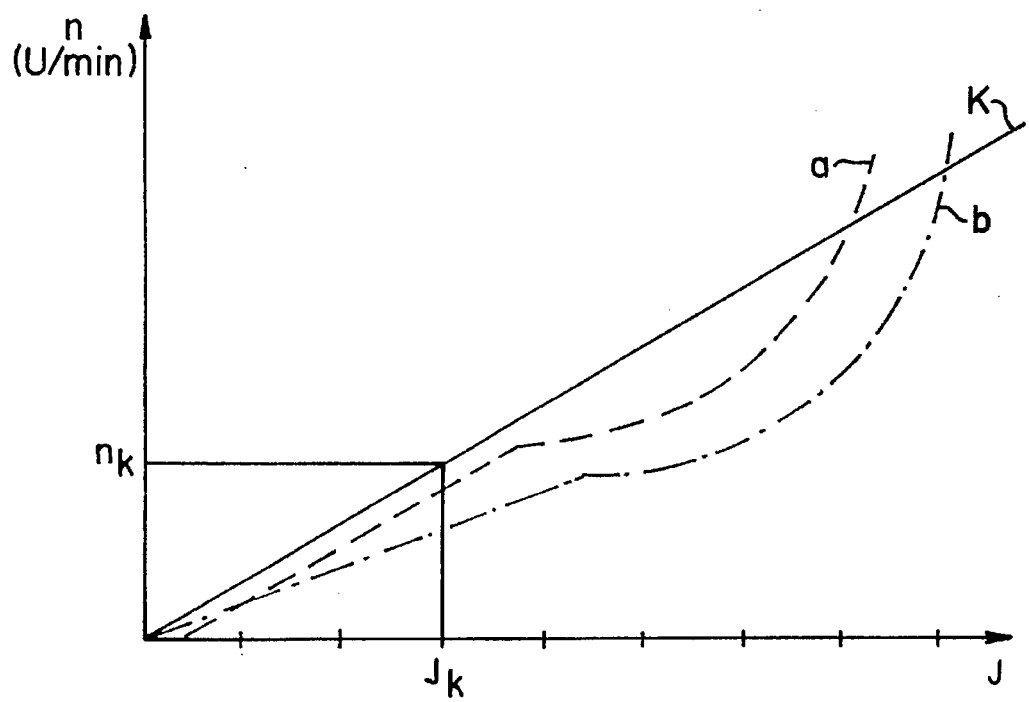
FIG. 2 is a graph showing the characteristics of the travelling drive mechanisms.

The characteristics of the two hydrostatic transmissions have been plotted in FIG. 2 of the drawings wherein a broken-line curve a is associated with hydrostatic transmission A and the dash-dotted line curve b is associated with hydrostatic transmission B. It is seen from FIG. 2 that when a specific operating variable J has the same value for both hydrostatic transmissions A and B the output speeds of the two transmissions will differ if their characteristics differ.

In accordance with the invention, prior to the first start-up of the vehicle, the respective characteristics a and b of hydrostatic transmissions A and B are detected by operating each transmission at various values of the operating variable J without load or with predetermined load, and noting the output speed value associated with each value of the operating variable J. The characteristics are detected by determining as many operating variable/output speed value pairs as possible and storing the pairs as a set of correlation data.

If at a later time during everyday travelling operation, as a result of the operation of speed selector 12 to select a predetermined rectilinear travel speed, microprocessor 5 predetermines a specified operating variable which is identical for both hydrostatic transmissions. The microprocessor "knows" the output speeds reached by the two hydrostatic transmissions in the case of this predetermined operating variable and intervenes to correct deviations from a reference characteristic in that the operating variables to be transmitted to the signal converters are changed in relation to the predetermined operating variable so that in actuality corrected operating variables issue from the microprocessor.

In the exemplary embodiment of the invention shown in FIG. 2 of the drawings, this is achieved by matching the individual characteristics of transmissions A and B to an "ideal" characteristic shown by solid line K. When an operating variable $J_k$ "to be predetermined" is selected, the microprocessor produces corrected operating variables for both hydrostatic transmissions A and B so that an output speed value $n_k$ associated with the selected operating variable $J_k$ in accordance with an ideal characteristic is obtained for both transmissions A and B.

However, it is also possible for the reference characteristic to be formed by one of the two characteristics a and b of hydrostatic transmissions A and B in place of an ideal characteristic K. In this mode of operation, an operating variable is selected and applied to one of transmissions A or B, while microprocessor 5 produces a corrected operating variable for the other hydrostatic transmissions B or A, so that the same output speed value is obtained for both transmissions A and B.

The foregoing describes a preferred embodiment of the invention and is given by way of example only. The invention is not limited to any of the specific features described herein, but includes all such variations thereof within the scope of the appended claims.

We claim:

1. A process for operating a vehicle subsequent to a first start up of the vehicle wherein the vehicle has a single prime mover, a plurality of independent traveling drive mechanisms driven by said single prime mover, and a plurality of infinitely variable transmissions, each connecting one of said traveling drive mechanisms to said prime mover, said process comprising the steps of: (a) generating and storing an operating characteristic of each of said infinitely variable transmissions prior to the first start up, defined by a plurality of pairs of operating variables/output speeds, by operating each of said infinitely variable transmissions through a substantially complete operating cycle of the operating variable, detecting corresponding output speeds for the various operating variables; and storing each pair of corresponding operating variables and output speeds as said operating characteristic of each of said infinitely variable transmissions in a close point sequence in an electronic unit; (b) thereafter automatically comparing the operating characteristic of each of said infinitely variable transmission with a reference characteristic in said electronic unit during vehicle travel; and (c) individually adjusting the operating variables of each of said infinitely variable transmissions according to deviations of said operating characteristics from said reference characteristic resulting from step (b) so that said infinitely variable transmissions operate with the same output speed, whereby the output speeds of the infinitely variable transmissions are substantially identical despite different operating characteristics.

2. The process as set forth in claim 1 wherein said reference operating characteristic is a stored ideal reference characteristic.

3. A process as set forth in claim 2 wherein said infinitely variable transmissions are hydrostatic transmissions having an adjustable gear ratio.

4. The process as set forth in claim 1 wherein the operating characteristic of one of said infinitely variable transmissions is selected as the reference characteristic.

5. A process as set forth in claim 4 wherein said infinitely variable transmissions are hydrostatic transmissions having an adjustable gear ratio.

6. A process as set forth in claim 1 wherein said infinitely variable transmissions are hydrostatic transmissions having an adjustable gear ratio.

7. A process as set forth in claim 1 wherein said infinitely variable transmissions are hydrostatic transmissions.

8. A process as set forth in claim 7 wherein said hydrostatic transmissions have an adjustable gear ratio.

9. A process for automatically operating a vehicle having a single prime mover subsequent to a first start up of the vehicle, a plurality of independent traveling drive mechanisms driven by said single prime mover, and a plurality of infinitely variable transmissions each connecting one of said traveling drive mechanisms to said prime mover and a speed selector for said infinitely variable transmissions, wherein each of said infinitely variable transmission has a variable output speed, and wherein the output speed of each of said infinitely variable transmission is controlled by selecting and applying an operating variable to said infinitely variable transmission, said process comprising the steps of:

a) prior to said first start up of the vehicle, determining the output speed for each said infinitely variable transmission resulting from a number of values of said operating variable to establish operating characteristics between the output speed of that infinitely variable transmission and the operating variable over a selected range of output speeds;

b) storing said operating characteristics established in step a) in a microprocessor connected to said speed selector; and c) thereafter automatically controlling said infinitely variable transmissions through said speed selector by:
  i) determining a desired value of the output speed of each said infinitely variable transmission from said microprocessor connected to said speed selector;
  ii) determining the operating variable to be applied to each of said infinitely variable transmission to achieve the desired output speed by reference to said established operating characteristics; and
  iii) applying the values of the operating variables determined in step ii) to each corresponding infinitely variable transmission.

10. A process as set forth in claim 9 wherein said infinitely variable transmissions are hydrostatic transmissions.

11. A process as set forth in claim 10 wherein said hydrostatic transmissions have an adjustable gear ratio.

* * * * *

UNITED STATES PATENT AND TRADEMARK OFFICE
CERTIFICATE OF CORRECTION

PATENT NO.  : 5,660,041
DATED       : August 26, 1997
INVENTOR(S) : Erwin Hartung and Hilmar Strenzke It is certified that error appears in the above-indentified patent and that said Letters Patent is hereby corrected as shown below:

Claim 9 Column 6 Line 16 "transmission" should read
--transmissions--.

Claim 9 Column 6 Line 18 "transmission" should read
--transmissions--.

Claim 9 Column 6 Line 35, under c)i), after "each" insert --of--.

Claim 9 Column 6 Line 35, under c)i), "transmission" should read
--transmissions--.

Claim 9 Column 6 Line 38 "transmission" should read
--transmissions--.

Signed and Sealed this

Twenty-third Day of December, 1997

Attest:

BRUCE LEHMAN

Attesting Officer

Commissioner of Patents and Trademarks